Oct. 9, 1956 R. E. PERKINS 2,765,820
SUPPORTING FRAME FOR ELECTRIC HAND SAWS
Filed Aug. 27, 1954
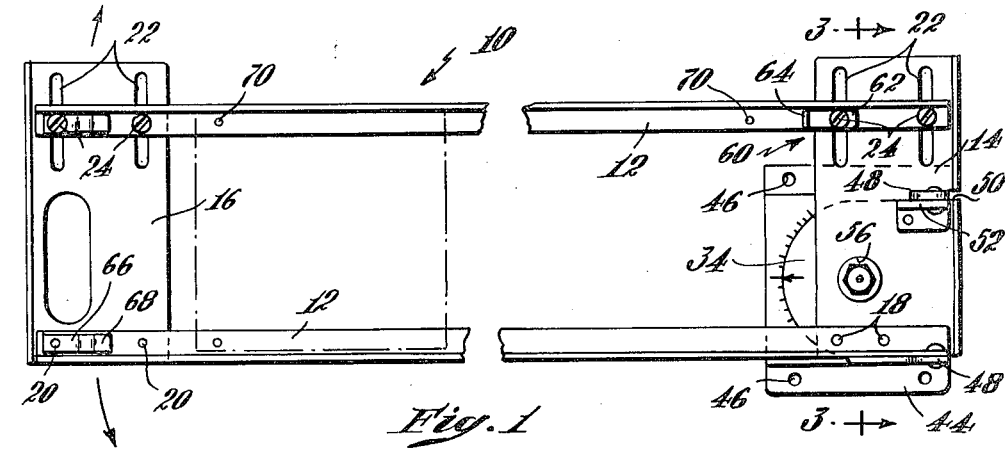
Fig. 1
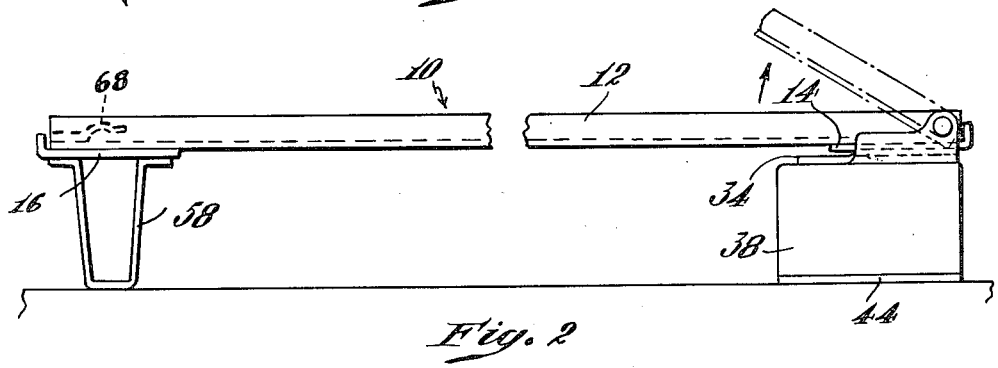
Fig. 2
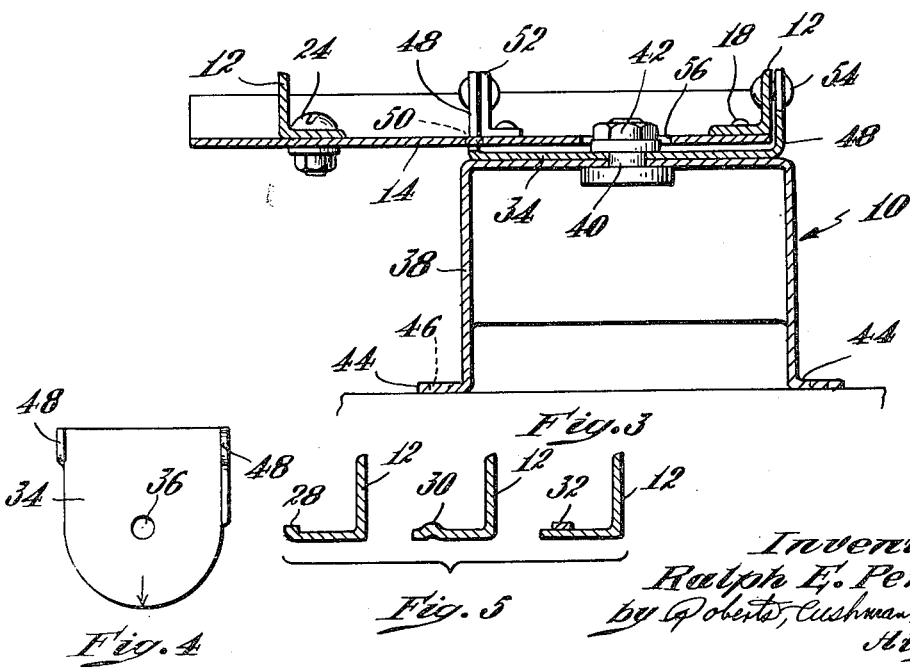
Fig. 3
Fig. 4
Fig. 5
Inventor
Ralph E. Perkins
by Roberts, Cushman & Grover
Attys

United States Patent Office 2,765,820
Patented Oct. 9, 1956

2,765,820

SUPPORTING FRAME FOR ELECTRIC HAND SAWS

Ralph E. Perkins, Sherborn, Mass.

Application August 27, 1954, Serial No. 452,551

4 Claims. (Cl. 143—6)

This invention relates to a device for use with power driven hand tools and more especially for use in conjunction with portable electric hand saws.

Power driven hand saws are notably difficult to handle due partly to their weight, partly to the high speed rotation of the saw blade itself and partly to inexperience and/or lack of skill on the part of the operator. In addition even in the hands of a skillful operator there is always danger due to accidental slipping of the work or breakage of the blade so that use of such tools is somewhat hazardous under the best conditions. Accordingly the principal objects of this invention are to provide a device for supporting, steadying and guiding an electric hand saw which will relieve the operator of supporting the weight of the saw thereby increasing the amount of work an operator may perform, which will guide the saw in a given direction along a straight line independently of the steadiness or unsteadiness of the operator's hand or his lack of skill thereby increasing his accuracy, which will hold the saw under control at all times independently of the condition of the work and/or damage to the saw blade itself so that danger to the operator is minimized, which will facilitate manipulation of the saw in such fashion as to enable the operator to make straight or angular cuts, which will facilitate placing the work in a position to be operated upon and provide for removing it after the operation has been performed, which will be simple, durable and of inexpensive construction and will make available to the owner of an electric hand saw substantially all of the advantageous characteristics embodied in a stationary power saw. Other objects of the invention are to provide a device which is not only useful in combination with electric saws as related above but is equally useful with an electric powered unit of the foregoing kind wherein a cutting disk such as an abrasive disk, routing tools and the like may be substituted for the saw blade. Still other objects are to provide a device for supporting guiding and steadying electric hand planers, buffers, drills, etc.

In accordance with the foregoing objects the device comprises a substantially rigid frame designed to receive, support and guide an electric hand saw for movement in a predetermined plane spaced from and parallel to the work to be operated upon, for angular movement in that plane to vary the angle at which the saw may be caused to make a cut in the work and for angular movement in a plane perpendicular thereto, to permit elevating the frame and saw to a position to facilitate arranging the work beneath the saw and removing work operated upon from beneath the saw. Specifically the frame has spaced parallel tracks for supporting the sole-plate or the equivalent of a sole-plate of a power driven hand saw so that movement of the saw along the tracks may be guided and constrained solely to linear motion thus enabling the operator to cut along a straight line. The frame has a footing at one end, for supporting it above the surface on which the work is resting, to which the frame is pivotally attached for angular movement in a horizontal plane about said end and angular movement in a vertical plane perpendicular to the plane of its horizontal movement to lift its opposite end upwardly from the work. Angular movement of the frame in the horizontal plane makes possible producing a corresponding angular cut in the work, for example for making miter cuts and angular movement in the vertical plane makes it possible to elevate both the frame and saw from the work so that the work may be placed in position to be worked on or removed thereof with the least amount of effort. Preferably a scale is scribed on the footing and a base mark on the frame so that the angle at which the frame is placed may be determined accurately. The opposite end of the frame is also provided with a footing for supporting this end at a corresponding level, that is so that the frame is substanitally horizontal. However this footing is freely movable horizontally and vertically with the frame as it is swung one way or the other or lifted. The side rails of the frame may be made up of multiple units so that its length may be increased or decreased as desired. Limit stops are fastened to the pivoted end of the frame for preventing the saw from being moved forwardly so far as to bring the blade into contact with the forward end of the frame and a pair of retaining clips are fastened to the rear end of the frame for engagement with the soleplate when the saw is at this end of the frame to facilitate lifting the saw and frame as a unit and/or shifting it angularly.

The invention will now be described in greater detail with reference to the accompanying drawing in which:

Fig. 1 is a plan view of the device broken midway between its ends;

Fig. 2 is a side elevation of Fig. 1;

Fig. 3 is a vertical section taken on the line 3—3 of Fig. 1;

Fig. 4 is a plan view of the swivel plate; and

Fig. 5 shows three possible cross sections for the frame rail.

Referring to Fig. 1 the device has a substantially rectangular rigid frame 10 comprised of spaced parallel angle irons or rails 12 secured at their opposite ends to transverse end plates 14 and 16. The right-hand angle iron is fixed at its forward end to the plate 14 by fastening means such as bolts or rivets 18 in permanent fashion and similarly at its rear end to the plate 16 by screw bolts 20. The left-hand rail however is adjustably fixed at its forward and rear ends to the plates 14 and 16 so that the distance between the rails may be adjusted to accommodate tools of different transverse dimension. To this end each of the plates 14 and 16 have spaced parallel, transversely extending slots 22 formed therein and the left-hand angle iron is attached at its opposite ends by bolts 24 which extend through holes in the angle iron and through the slots. The angle irons are fastened to the end plates so that two of their flanges lie in a common horizontal plane and provide spaced tracks for slidably receiving the sole-plate of a tool, hereinafter referred to as an electric saw, for movement therealong and with the other flanges disposed in spaced parallel relation at the outer edges of the first flanges so as to rise vertically therefrom and to embrace the opposite edges of the soleplate, thereby to constrain movement of the tool to linear motion.

Since most operations which would be carried out with this device make dust which is apt to accumulate on the rails and thus make sliding movement of the sole-plate along the rails difficult, it is within the intent of the invention to minimize frictional resistance to movement of the tool along the rails by reducing the bearing areas. Three convenient and simple ways of accomplishing this are illustrated in Fig. 5 and comprise bending the inner edge of the horizontal flange of each rail upwardly to provide a narrow rib 28 for engagement with the underside of the sole-plate or pressing in the middle of the horizontal flange a continuous bead 30 or a discontinuous series of pimples 30 or fastening to the horizontal flange of the rail a narrow track 32. While the foregoing are simple expedients for reducing friction, it is within the contemplation of the invention to use any equivalent antifriction devices available for this purpose.

To provide for supporting the frame above the work to be operated upon and for angular movement in horizontal and vertical planes to permit making angular cuts in the work and lifting the frame away from the work so that the work may be placed beneath the saw or removed therefrom the forward end of the frame is pivotally supported for movement about vertical and horizontal axes. Angular movement about the vertical axis so that the frame may be swung angularly in a horizontal plane is afforded by a swivel plate 34 having a hole 36 through it. The swivel plate 34 is supported by a box-like base 38 to which there is fixed a vertical threaded stud 40 over which the plate is placed and secured by a washer and nut assembly 42. The hole 36 in the plate is made large enough so that it does not bind on the threads thus permitting the plate to turn freely on the stud. The box-like support has laterally extending flanges 44 provided with suitable bolt holes 46 so that the support may be bolted to a table or bench or other supporting surface for use. The vertical height of the support 38 should be sufficient to permit sliding work to be operated upon beneath the frame when the latter is attached to the swivel plate and may be elevated by bolting extensions to the flanges 44.

To permit both angular movement in a horizontal plane and angular movement in a vertical plane the swivel plate 34 is provided with spaced upstanding ears 48 and the end plate 14 is provided with a slot 50 through which the left-hand ear 48 may project upwardly when the plate 14 is placed on the swivel plate 34. As thus positioned the right-hand ear 48 projects upwardly beside the end of the plate 14 paralleling the vertical flange of the rail 12. Adjacent the slot 50 there is fastened an ear 52 which parallels the left-hand ear 48 and registering holes are made in the ears 48 and 50 at the left-hand end of the plate and in the ear 48 and the vertical flange of the rail 12 at the right-hand end of the plate through which rivets or equivalent fastening elements 54 are placed. An opening 56 is provided in the end plate 14 so as to register with the upper end of the stud 40 to afford access to the nut which secures the swivel plate to the stud 40. As thus constructed it is apparent that the frame may be swung about the vertical axis of the stud 40 and may be lifted about a horizontal axis coinciding with the axes of the fastening elements 54. By turning the nut 42 down hard after the frame has been swung to the desired position it may be fixed in that position without interfering with lifting it about its horizontal pivot.

The rear end of the frame is desirably supported at a corresponding level and to this end legs 58 are fastened to the underside of the end plate 16 preferably by the same screws 20 and 24 which are used in fastening the rails to the end plate. The legs 58 being fast to the frame are movable therewith when the frame is adjusted angularly in either of its horizontal or vertical planes and will normally support the frame when work is being operated upon. These may also be lengthened by bolting extensions thereto.

In order to accurately set the frame at a proper angle and to facilitate such adjustment a scale is marked on the upper surface of the base 38 and a base mark is made on the swivel plate, the forward end of which is semi-circular and has as its center of curvature the vertical axis of the stud so that as the frame is swung in one direction or the other the base mark will move angularly along the scale indicating the angular position of the frame at any given time. If the saw were moved too far forward, that is toward the pivoted end of the frame the cutting edge of the saw might be accidentally brought into engagement with the end of the frame with disastrous results. Accordingly one or more stops 60 are provided, each of which consists of an angle bracket having a slotted base 62 and a right angularly located abutment 64. As shown in Fig. 1 only one of these stops is employed and is fastened to the horizontal flange of the left-hand rail 12 by means of one or more of the screws 24 so that the abutment 64 is substantially perpendicular to the horizontal flange of the rail and will prevent forward movement of the tool beyond a point where the forward edge of the sole-plate engages the same.

Normally the saw is not attached to the rails but merely rests thereon and slides forwardly and rearwardly therealong. During adjustment of the frame angularly however, it is convenient to be able to move both the saw and the frame as a unit. Hence there is fastened to the plate 16 a pair of spring clips 66, the clips being attached by the same screws employed to fasten the rails and legs to the plate 16. Each clip has a forwardly, extending, elastic lip 68 designed to yieldably receive beneath it the rear edge of the sole-plate of the tool when the latter is drawn to its rearmost position thereby to temporarily hold the saw and frame together so that the operator by moving the saw about at the same time moves the frame. Usually the sole-plate of the saw has at its forward and rear edges a slightly upturned lip which when pressed beneath the clips affords firm engagement.

The nature of the work to be operated upon will, of course, vary considerably in dimensions. Accordingly it is desirable to be able to increase the length of the frame. To this end the rails may be made in sections with one or more bolt holes 70 at each end so that when it is desirable to increase the length of the frame, sections may be added merely by introducing extra sections and bolting them in place.

In use the device is preferably bolted to the top of a table, bench or other large stable surface by fastening the flanges 44 to the surface. The tool whether it is a power driven electric saw or any other equivalent or similar power driven tool is then placed on the rails with its sole plate engaged with the clips so as to temporarily hold the saw and frame together as a unit. The work is then placed beneath the frame either by first lifting the frame about its forward end to place the work therebeneath or by sliding it beneath the frame and then the frame is adjusted angularly in a horizontal plane about its vertical pivot to make either a right cut or an angular cut across the work. After the frame has been properly set as can be determined by the position of the base mark and the scale the operator disengages the tool from the clips and moves it along the rails from the rear end toward the forward end so as to accomplish the cutting or other operation to be performed.

Usually the electric saw comes with an angular adjustment which permits tilting the plane of the saw about a forwardly and rearwardly extending axis so that in combination with the angular adjustment afforded by the present frame, angular cuts can be made in two planes such as are usually required in making hip roof rafters and the like.

In the description, merely for convenience, the front or forward end of the device has been designated as that at which the member 38 is located, but it is to be understood that the terms "front" or "forward" as thus employed have no limiting significance, either as to the structure of the mode of use of the device.

It should be understood that the present disclosure is for the purpose of illustration only and that this invention includes all modifications and equivalents which fall within the scope of the appended claims.

I claim:

1. A device for use with power driven hand tools to facilitate manipulation thereof while operating upon work resting on a support, comprising longitudinally spaced, parallel end plates and transversely spaced, parallel rails having horizontally disposed supporting flanges and vertically disposed retaining flanges, one of said rails being immovably fixed to the end plates and the other adjustably fixed thereto, to permit lateral adjustment of the rail to change the spacing between the rails, said end plates and rails constituting a rigid frame in which the rails are adapted to receive between them for supporting and linearly guiding the sole plate of a power operated tool, a lug fast to one of the rails at the far end of the frame to limit movement of the sole plate and hence the tool toward that end, a pair of spaced spring clips on the rails at the near end of the frame adapted to receive beneath them the edge of the sole plate to lock the frame thereto, for lifting of the tool and frame in unison, said end plate at the far end having a slot through it and an upstanding flange fast thereto, said flange and the vertical flange of the fixed one of the rails having horizontally arranged aligned holes, a swivel plate having a hole at its center and laterally spaced upstanding ears projecting upwardly through the slot and along the outer side of the vertical flange of the fixed rail, said ears having horizontally aligned holes in registration with the holes in the flange and rail, pins fixed in the holes which connect the frame to the swivel plate for tilting in elevation, a bearing member having a flat bearing surface on which the swivel plate rests, and a vertical post fast thereto and extending upwardly therefrom through the hole in the swivel plate, said post having a threaded upper part adapted to receive a retaining nut to hold the swivel plate on the bearing while permitting freedom of swivel movement of the frame in a horizontal plane, legs supporting the bearing member in a horizontal position above the work support so as to leave a work-receiving space beneath the frame, said legs having footing flanges at their lower ends adapted to rest on the work support, a bench mark on the swivel plate and a scale on the bearing surface cooperable to indicate the angular position of the frame at any given time, and a pair of legs at the near end of the frame, one fastened to each corner and corresponding in vertical height to the height of the far end of the frame from the work support for supporting the near end of the frame at a level with the far end, said legs being movable with the frame.

2. A device for use with power driven hand tools according to claim 1, wherein the horizontal flanges of the tracks have spaced holes near their rear ends and are adapted to have bolted thereto lengthening sections to increase the overall length of the frame.

3. A device for use with power driven hand tools according to claim 1, wherein the retaining nut provides clamping means for fastening the frame at a predetermined angle in its horizontal plane without interfering with the free angular movement of the frame in the perpendicular plane.

4. A device for use with power driven hand tools according to claim 1, wherein said bearing legs and the legs at the near end of the frame have means for receiving extensions to raise the level of the device with respect to the work.

References Cited in the file of this patent

UNITED STATES PATENTS

| | | |
|---|---|---|
| 1,457,492 | Bloodgood | June 5, 1923 |
| 1,618,341 | Howland | Feb. 22, 1927 |
| 1,638,122 | Jull | Aug. 9, 1927 |
| 1,828,043 | Hedgpeth | Oct. 20, 1931 |
| 2,513,497 | Laughlin | July 4, 1950 |
| 2,556,137 | Emmons | June 5, 1951 |
| 2,558,217 | Hess et al. | June 26, 1951 |
| 2,596,524 | Bridwell | May 13, 1952 |
| 2,626,638 | Gesner | Jan. 27, 1953 |
| 2,630,146 | Van Tuyl | Mar. 3, 1953 |
| 2,633,162 | Neuenschwander | Mar. 31, 1953 |
| 2,656,860 | Thayer | Oct. 27, 1953 |